United States Patent
Erhart et al.

(10) Patent No.: US 11,407,311 B2
(45) Date of Patent: Aug. 9, 2022

(54) DUAL POWER SUPPLY SYSTEM

(71) Applicant: SAMSUNG SDI CO., LTD., Yongin-si (KR)

(72) Inventors: Michael Erhart, Pirka-Seiersberg (AT); Thomas Korherr, Hartberg (AT)

(73) Assignee: Samsung SDI Co., Ltd., Gyeonggi-do (KR)

( * ) Notice: Subject to any disclaimer, the term of this patent is extended or adjusted under 35 U.S.C. 154(b) by 67 days.

(21) Appl. No.: 16/535,473

(22) Filed: Aug. 8, 2019

(65) Prior Publication Data
US 2019/0359081 A1 Nov. 28, 2019

Related U.S. Application Data

(63) Continuation of application No. PCT/KR2017/014732, filed on Dec. 14, 2017.

(30) Foreign Application Priority Data

Feb. 9, 2017 (EP) .................................. 17155310

(51) Int. Cl.
*B60L 1/00* (2006.01)
*B60L 50/60* (2019.01)
(Continued)

(52) U.S. Cl.
CPC .............. *B60L 1/003* (2013.01); *B60L 50/66* (2019.02); *B60L 58/22* (2019.02); *H02J 7/0014* (2013.01);
(Continued)

(58) Field of Classification Search
CPC ................................. B60L 1/003; B60L 50/66
See application file for complete search history.

(56) References Cited

U.S. PATENT DOCUMENTS 3,975,670 A * 8/1976 McDermott .............. H02J 7/14
320/121
4,203,151 A * 5/1980 Baker ................... H02M 7/487
363/132
(Continued)

FOREIGN PATENT DOCUMENTS

CN 103907239 A 7/2014
CN 104853949 A 8/2015
(Continued)

OTHER PUBLICATIONS

International Search Report and Written Opinion of the International Searching Authority dated Mar. 21, 2018 for International Patent Application No. PCT/KR2017/014732 filed Dec. 14, 2017, of which subject U.S. Appl. No. 16/535,473 is a Continuation, each of which claims priority from European Patent Application No. EP 17155310.0 filed Feb. 9, 2017.
(Continued)

Primary Examiner — Adi Amrany
(74) Attorney, Agent, or Firm — Knobbe, Martens, Olson & Bear, LLP

(57) ABSTRACT

A dual power supply system with first to third system terminals is disclosed. The dual power supply system includes a first battery cell stack interconnected between first and second stack nodes and providing a first operation voltage and a second battery cell stack interconnected between the second stack node and a third stack node and providing a second operation voltage. The dual power supply system further includes a DC/DC converter with first to third converter nodes and configured to convert a voltage of the first or second battery cell stack. Each of the system terminals is connected to the respective stack node or converter node in parallel. The DC/DC converter can provide redundant power supply and active balancing. The
(Continued)

application further relates to a vehicle including the above dual power supply system.

18 Claims, 4 Drawing Sheets

(51) Int. Cl.
*B60L 58/22* (2019.01)
*H02J 7/00* (2006.01)

(52) U.S. Cl.
CPC ....... *B60L 2210/10* (2013.01); *B60Y 2200/91* (2013.01)

(56) References Cited

U.S. PATENT DOCUMENTS

| | | | | |
|---|---|---|---|---|
| 4,698,578 A * | 10/1987 | Mullersman | .......... | H02J 7/0031 320/121 |
| 4,967,136 A * | 10/1990 | Nofzinger | ............. | H02J 7/1423 320/116 |
| 5,350,994 A * | 9/1994 | Kinoshita | ................ | B60L 53/20 320/116 |
| 5,479,083 A * | 12/1995 | Brainard | ........... | H01M 10/0413 320/121 |
| 5,528,122 A * | 6/1996 | Sullivan | ................ | H02J 7/0018 320/118 |
| 5,814,970 A * | 9/1998 | Schmidt | ............. | H01M 10/441 320/118 |
| 6,271,645 B1 * | 8/2001 | Schneider | ................ | B60L 58/12 320/118 |
| 6,323,608 B1 * | 11/2001 | Ozawa | .................. | H02J 7/1423 318/139 |
| 6,426,608 B2 * | 7/2002 | Amano | .................... | B60L 7/14 320/163 |
| 6,455,951 B1 * | 9/2002 | Shultz | .................. | H02J 7/1423 307/10.1 |
| 6,489,753 B1 * | 12/2002 | Patterson | .............. | H02J 7/0014 320/162 |
| 6,507,506 B1 * | 1/2003 | Pinas | ................ | H02M 3/33584 363/79 |
| 6,909,201 B2 * | 6/2005 | Murty | ................... | H02J 7/1423 307/10.1 |
| 6,982,499 B1 * | 1/2006 | Kachi | .................. | B60L 15/2045 307/75 |
| 7,221,064 B2 * | 5/2007 | Okuda | .................. | H02J 7/1438 307/10.1 |
| 8,097,975 B2 * | 1/2012 | Bosch | .................. | H02J 7/1423 307/10.1 |
| 8,421,417 B2 | 4/2013 | Kim et al. | | |
| 8,575,883 B2 | 11/2013 | Sone | | |
| 10,272,788 B2 * | 4/2019 | Huh | ........ | H02M 7/44 |
| 10,447,045 B2 * | 10/2019 | Morita | .................... | H02J 7/007 |
| 2002/0167291 A1 | 11/2002 | Imai et al. | | |
| 2004/0135544 A1 * | 7/2004 | King | ..................... | B60W 10/26 320/116 |
| 2005/0151509 A1 * | 7/2005 | Cook | .................... | H02J 7/0018 320/116 |
| 2005/0156574 A1 | 7/2005 | Sato et al. | | |
| 2009/0072625 A1 | 3/2009 | Oga | | |
| 2009/0295335 A1 | 12/2009 | Yang et al. | | |
| 2010/0283427 A1 | 11/2010 | Sugiyama et al. | | |
| 2013/0076152 A1 | 3/2013 | Nielsen | | |
| 2013/0265010 A1 | 10/2013 | Nomura et al. | | |
| 2014/0009105 A1 | 1/2014 | Keates | | |
| 2014/0098578 A1 * | 4/2014 | Halberstadt | ....... | H02M 3/33592 363/21.15 |
| 2014/0183939 A1 | 7/2014 | Jiang et al. | | |
| 2014/0306662 A1 * | 10/2014 | Kim | ....................... | H02J 7/007 320/118 |
| 2015/0115707 A1 * | 4/2015 | Reichow | .................... | H02J 1/00 307/10.1 |
| 2016/0318411 A1 | 11/2016 | Goetz et al. | | |
| 2016/0347197 A1 | 12/2016 | Fink | | |
| 2017/0036545 A1 * | 2/2017 | Lopez De Arroyabe | .................... | B60L 58/20 |
| 2017/0214252 A1 * | 7/2017 | Preindl | ................. | H02J 7/0014 |
| 2017/0373510 A1 | 12/2017 | Morita | | |
| 2018/0323638 A1 * | 11/2018 | Eriksson | ............. | F02N 11/0866 |
| 2020/0079232 A1 * | 3/2020 | Erhart | ..................... | B60L 58/22 |

FOREIGN PATENT DOCUMENTS

| | | | |
|---|---|---|---|
| CN | 105934866 A | 9/2016 | |
| CN | 106099898 A | 11/2016 | |
| EP | 2 426 005 A2 | 3/2012 | |
| EP | 2 068 431 B1 | 1/2015 | |
| JP | 2007-267454 A | 10/2007 | |
| JP | 4244531 B2 | 3/2009 | |
| JP | 2014-003890 A | 1/2014 | |
| KR | 10-2007-0082970 A | 8/2007 | |
| KR | 10-2009-0126098 A | 12/2009 | |
| KR | 10-2011-0019085 A | 2/2011 | |
| KR | 10-2012-0138466 A | 12/2012 | |
| KR | 10-2013-0113979 A | 10/2013 | |
| KR | 10-2016-0133789 A | 11/2016 | |
| WO | WO 2016/121273 A1 | 8/2016 | |
| WO | WO 2018/147542 A1 | 8/2018 | |

OTHER PUBLICATIONS

Extended European Search Report dated Aug. 21, 2017 for European Patent Application No. EP 17 155 310.0, from which subject U.S. Appl. No. 16/535,473 claims priority.
European Examination Report dated May 10, 2019 for European Patent Application No. EP 17 155 310.0, from which subject U.S. Appl. No. 16/535,473 claims priority.
First Office Action dated Mar. 29. 2022 in corresponding Chinese patent application No. 201780086151.5, 20 pp.

* cited by examiner

Prior art

DUAL POWER SUPPLY SYSTEM

CROSS-REFERENCE TO RELATED APPLICATIONS

This application is a continuation application and claims the benefit under 35 U.S.C. §§ 120 and 365 of PCT Application No. PCT/KR2017/014732, filed on Dec. 14, 2017, which is hereby incorporated by reference. PCT/KR2017/014732 also claimed priority to European Patent Application No. 17155310.0 filed on Feb. 9, 2017, which is hereby incorporated by reference.

TECHNICAL FIELD

The present invention relates to a dual power supply system, particularly to a dual power supply battery system for an electric vehicle comprising a 48V board net and a 12V board net.

RELATED TECHNOLOGY

A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g., cylindrical or rectangular, depends on the battery's intended purpose.

Rechargeable batteries may be used as a battery module formed of a plurality of unit battery cells coupled in series and/or in parallel so as to provide a high energy density, e.g., for motor driving of a hybrid vehicle. That is, the battery module is formed by interconnecting the electrode terminals of the plurality of unit battery cells depending on a required amount of power and in order to realize a high-power rechargeable battery, e.g., for an electric vehicle. One or more battery modules are mechanically and electrically integrated, equipped with a thermal management system and set up for communication with one or more electrical consumers in order to form a battery system.

For meeting the dynamic power demands of various electrical consumers connected to the battery system a static control of battery power output and charging is not sufficient. Thus, steady or intermittent exchange of information between the battery system and the controllers of the electrical consumers is required. This information includes the battery systems actual state of charge (SoC), potential electrical performance, charging ability and internal resistance as well as actual or predicted power demands or surpluses of the consumers.

For monitoring, controlling and/or setting of the aforementioned parameters a battery system usually comprises a battery management unit (BMU) and/or a battery management system (BMS). Such control units may be an integral part of the battery system and disposed within a common housing or may be part of a remote control unit communicating with the battery system via a suitable communication bus. In both cases, the control unit communicates with the electrical consumers via a suitable communication bus, e.g., a CAN or SPI interface.

The electric engine of electric vehicles may be supplied by a high voltage battery system, e.g., a 48V battery system. The 48V battery system is connected to a 48V board net that may comprise electronic control units (ECUs) powered by the 48V battery system. The 48V battery system is usually charged by an electric generator (combined starter generator).

The electric vehicles may further comprise a 12V board net that might be related to security relevant functions. Exemplarily, an ECU of a power steering system or an ECU of an antiskid system may be integrated in the 12V board net. The 12V board net may comprise a 12V battery system, e.g., a lead-acid based 12V battery, which may be charged by the 48V board net via a DC/DC converter.

Hence an electric vehicle according to the prior art usually comprises a 12V battery system, a DC/DC converter and a 48V battery system, wherein each of these components requires installation space, increases the weight of the vehicle, reduces the efficiency of the vehicle and increases the costs of the vehicle.

SUMMARY OF CERTAIN INVENTIVE ASPECTS

It is thus an object of the present invention to provide an alternative dual power supply system, particularly for an electric vehicle, for supplying different operating voltages, particularly for supplying two different board nets of an electric vehicle. The production costs, weight and installation space requirements of the dual power supply system shall be decreased compared to the prior art. In an electric vehicle, the dual power supply system shall further ensure security relevant functions of the electric vehicle.

One or more of the drawbacks of the prior art could be avoided or at least reduced by means of the present invention, according to which a dual power supply system is provided that comprises a first system terminal, a second system terminal and a third system terminal. Each of the system terminals is configured for externally and electrically contacting the dual power supply system. The dual power supply system further comprises a first battery cell stack that is interconnected between a first stack node and a second stack node and that is configured for providing a first operation voltage. The dual power supply system further comprises a second battery cell stack that is interconnected between the second stack node and a third stack node and that is configured for providing a second operation voltage.

Each of the first and second battery cell stacks comprises a plurality of battery cells that are electrically connected in series between the respective stack nodes. The battery cell stacks may further comprise battery cells connected in parallel between the respective stack nodes. The amount of cells connected in parallel or series between the stack nodes might differ between the first and second battery cell stack. A plurality of submodules, each comprising a plurality of cells connected in parallel, may be connected in series between the first stack node and the second stack node or the second stack node and the third stack node. The first battery cell stack and the second battery cell stack are connected in series between the first stack node and the third stack node.

The added voltage of all battery cells connected in series between the first stack node and the third stack node applies between these stack nodes. The added voltage of all cells connected in series between the first and second stack node applies between these stack nodes. The added voltage of all cells connected in series between the second and third stack node applies between these stack nodes. Preferably, the voltage applied between the first stack node and second node differs from the voltage applied between the second stack node and third stack node for dual power supply. The battery cells of the first battery cell stack may comprise a different capacity than the battery cells of the second battery cell stack.

The dual power supply system of the invention further comprises a DC/DC converter with a first converter node, a second converter node and a third converter node. Preferably, the DC/DC converter is one of a buck converter, a boost converter, a forward converter, and a flyback converter. Particularly preferred, the converter is one of a full bridge converter, a buck-boost converter and a push-pull converter. Essentially, the DC/DC converter is configured for converting a first voltage (input voltage) between the second converter node and one of the first converter node and the third converter node to a second voltage (output voltage) between the second converter node and the other one of the first converter node and the third converter node. The converted voltage (output voltage) may be higher or lower than the initial voltage (input voltage). Preferably, the DC/DC converter can be set to provide either an output voltage that is higher or a lower than the input voltage.

According to the present invention, the first system terminal is connected to the first stack node and the first converter node in parallel. Further, the second system terminal is connected to the second stack node and the second converter node in parallel and the third system terminal is connected to the third stack node and the third converter node in parallel. In other words, the system terminals are interconnected between the stack nodes and the converter nodes. Essentially, the converter nodes are not interconnected between the system terminals and the stack nodes. Preferably, each system terminal is connected to the respective stack node via a first conductor or first power line and is connected to the respective converter node via a second conductor or second power line that is different from the first conductor or first power line. This allows for using the DC/DC converter in a redundant power supply, e.g., for ensuring security relevant functions in an electric vehicle. It further allows for using the DC/DC converter for active balancing between the first battery cell stack and second battery cell stack.

According to the present invention a dual power supply system, particularly a dual power supply battery system, is provided with a double power supply as an integrated feature of a single battery system. Particularly preferred, the aforementioned features are arranged in a common housing. By integrating the DC/DC converter into the battery system of the invention as described above, the DC/DC converter can be utilized for redundant power supply as well as for active and bidirectional balancing between the two battery cell stacks.

According to a preferred embodiment of the invention, the dual power supply system further comprises a first blocking element that is configured for blocking a current from the first system terminal to the first stack node. Alternatively or additionally, the dual power supply system preferably comprises a second blocking element configured for blocking a current from the third system terminal to the third stack node. Such blocking element hinders backflow of electric power from the output nodes of the DC/DC converter to one of the battery cell stacks. Hence the converted voltage can be exclusively provided to an external load via the system terminal and the dual power supply system can be efficiently utilized for redundant power supply. Particularly preferred, the first blocking element is a first diode with its anode connected to the first stack node and its cathode connected to the first system terminal. Further preferred the second blocking element is a second diode with its anode connected to the third stack node and its cathode connected to the third system terminal. Particularly preferred only one of the first and second blocking elements is arranged in the dual power supply system. Hence, the DC/DC converter can be used for one-directional active balancing towards one of the battery cell stacks via the respective unblocked first conductor and for redundant power supply in frame for the other one of the battery cell stacks.

According to a further preferred embodiment, the first blocking element is a first switching element that is configured for selectively blocking a current from the first system terminal to the first stack node. Alternatively or additionally, the second blocking element is a third switching element that is configured for selectively blocking a current from the third system terminal to the third stack node. By utilizing switching elements as selective blocking elements the DC/DC converter can be utilized for redundant power supply as well as for active bidirectional balancing with respect to both battery cell stacks. A switching element set nonconductive interrupts the respective first conductor. Hence no current flows from the DC/DC converter to the respective battery cell stack but can be exclusively provided to external loads. A switching element set conductive enables a current from the DC/DC converter to flow into the respective battery cell stack instead to an external load.

Preferably, the dual power supply system further comprises a second switching element that is interconnected between the second terminal and the second stack node. By disposing a respective switching element between each of the system terminals and the respective stack node, one can cut the battery cell stacks completely from any external load. Hence, an emergency shutdown of the battery cell stacks may be realized. Further preferred, at least one of the first switching element, the second switching element and the third switching element is a relay. Alternatively, the switching elements may be semiconductor switches. Further preferred, transistor switches are used for the first and/or second switching element.

In a preferred embodiment of the dual power supply system the sum of the first operation voltage and the second operation voltage is about 48V. Further, the second operation voltage is about 12V. Hence, the first operation voltage is about 36V. According to this embodiment, the dual power supply system is adapted to be utilized in an electric vehicle comprising a 48V board net and a 12V board net. Therein, the second battery cell stack supplies the 12V board net and the first battery cell stack connected in series with the second battery cell stack supplies the 48V board net. Via the DC/DC converter, the 12V board net can also be supplied via the first battery cell stack. Via the DC/DC converter, the 48V board net can be supplied by one of the first battery cell stack and the second battery cell stack. Hence, redundant power supply, e.g., in case of a cell failure in one of the first and second battery cell stack, is ensured.

Particularly preferred, the DC/DC converter comprises an inductance, e.g., a choke, which is electrically connected to the second converter node. Particularly, a first node of the inductance is electrically connected to the second converter node. Further, a switching transistor is interconnected between the second node of the inductance and one of the first converter node and the third converter node. A diode is connected with its cathode to the second node of the inductance and with its anode to the other one of the first converter node and the third converter node. According to this exemplary embodiment, one of the first and second battery cell stacks can be used for redundant power supply of an external load and also for active balancing, i.e. power transfer, to the other one of the first and second battery cell stack. Particularly preferred, the first battery cell stack, e.g., a 36V battery cell stack, is utilized for transferring power to the second battery cell stack, e.g., a 12V battery cell stack that might be drained also during a sleep mode of the dual power supply system. Further preferred, the first battery cell stack, e.g., a 36V battery cell stack, is utilized for redundant power supply to loads of the second battery cell stack, e.g., in a vehicle's 12V board net. In this case, the diode is interconnected between the inductance and the third converter node.

In a further preferred embodiment, the DC/DC converter comprises an inductance, e.g., a choke, which is electrically connected to the second converter node. Particularly, a first node of the inductance is electrically connected to the second converter node. The DC/DC converter further comprises a first switching transistor that is interconnected between the second node of the inductance and the first converter node and a second switching transistor that is interconnected between the second node of the inductance and the third converter node. According to this exemplary embodiment, each of the first and second battery cell stacks can be used for redundant power supply of an external load and also for active balancing, i.e. power transfer, to the other one of the first and second battery cell stack.

Further preferred, a first freewheeling diode is connected in parallel with the first switching transistor and configured to block overcurrent from the inductance to the first converter node. Thus, the freewheeling diode is connected with its cathode to the inductance and with its anode to the first converter node. Preferably, a second freewheeling diode is connected in parallel with the second switching transistor and configured to block overcurrent from the inductance to the third converter node. Thus, the freewheeling diode is connected with its cathode to the inductance and with its anode to the third converter node.

According to a further preferred embodiment of the dual power system, the DC/DC converter comprises at least one of a first capacitor interconnected between the first converter node and the third (or second) converter node. The first capacitor may be configured as high pass filter in order to protect a first switching transistor and/or the inductance against AC components. The first capacitor may further be configured for limiting the total voltage supplied to the inductance by the first battery cell stack and/or for limiting the total current across a first switching transistor during a single period. The DC/DC converter may further comprise a second filter capacitor that is interconnected between the third converter node and the second (or first) converter node. The second capacitor may be configured as high pass filter in order to protect a second switching transistor and/or the inductance against AC components. The second capacitor may further be configured for limiting the total voltage supplied to the inductance by the second battery cell stack and/or for limiting the total current across a second switching transistor during a single period.

Preferably, the dual power supply system further comprises a control unit that is configured for setting the duty cycle of at least one switching transistor. Further preferred, the control unit may be configured for alternatingly setting first switching transistor and second switching transistor conductive. The control unit may be an internal part of the dual power supply system and further may be an integral part of the DC/DC converter. Alternatively, the control is external to the dual power supply system but is functionally integrated with the dual power supply system. In an electric vehicle, the control unit may be a control unit of the vehicle.

Another aspect of the present invention relates to a vehicle comprising a dual power supply system according to the invention as described above. Preferably, the vehicle further comprises a starter generator that is interconnected between the first system terminal and the second system terminal. Hence, the first battery cell stack can be charged by the starter generator. Alternatively, the starter generator is interconnected between the first system terminal and the third system terminal. Hence, the first and second battery cell stack can be charged by the starter generator. Further, external loads interconnected between the first and third (or second) system terminals can be powered directly by the starter generator.

Alternatively or additionally, the vehicle further comprises at least one first load interconnected between the first system terminal and the third system terminal and at least one second load interconnected between the second system terminal and the third system terminal. Preferably, the first load has an operation voltage of about 48V and the second load has an operation voltage of about 12V. The vehicle may further comprise a third load interconnected between the first system terminal and the second system terminal. The third load may be operated at a voltage of 36V.

Another aspect of the present invention relates to a method for operating a dual power supply system according to the invention that is part of a vehicle according to the invention as described above. According to the method of the invention, the dual power supply system is operated in one of a first, second or third operation mode.

Therein, in the first operation mode, at least one first load is power supplied by the first battery cell stack and the second battery cell stack. In other words, an operation voltage is supplied to at least one first load by the first battery cell stack that is connected in series with the second battery cell stack. Alternatively, at least one first load is power supplied directly by the starter generator, i.e. the starter generator supplies the operation voltage to the at least one first load. Further, at least one second load is power supplied by the second battery cell stack, i.e. an operation voltage is supplied to at least one second load by the second battery cell stack. In other words, the first operation mode is a normal operation mode with the first battery cell stack and the second battery cell stack in a normal operation condition. In the first operation mode, the first battery cell stack may be charged via the starter generator, while the second battery cell stack may be charged by the first battery cell stack via the DC/DC converter. Alternatively, first and second battery cell stack are directly charged by the starter generator.

Particularly preferred, the dual power supply system comprises a first switching element and a third switching element as described above. Then, the first operation mode further may further comprise active balancing, wherein the third switching element is set conductive and electric power is transferred from the first battery cell stack to the second battery cell stack via the DC/DC converter. The first operation mode may further comprise active balancing, wherein the first switching element is set conductive and electric power is transferred from the second battery cell stack to the first battery cell stack via the DC/DC converter. Exemplarily, the second battery cell stack may receive power from the first battery cell stack after wake up from a sleep mode, wherein solely power of the second battery cell stack is consumed during sleep mode. Exemplarily, the first battery cell stack may receive power from the second battery cell stack for supplying one or more third loads, i.e. for supplying an operation voltage to one or more third loads.

In the second operation mode of the dual power supply system of the vehicle as described above at least one first load is power supplied by the first battery cell stack via the DC/DC converter, i.e. an operation voltage is supplied to at least one first load by the first battery cell stack via the DC/DC converter. Alternatively or additionally at least one second load is power supplied by the first battery cell stack via the DC/DC converter, i.e. an operation voltage is supplied to at least one second load by the first battery cell stack via the DC/DC converter. The second operation mode might be initiated in response to a failure, e.g., a cell failure, in the second battery cell stack. Hence, for supplying a first load, a (output) voltage is boosted (step-up conversion) from the (input) voltage of the first battery cell stack. For supplying a second load, a (output) voltage is stepped down from the (input) voltage of the first battery cell stack. Particularly preferred, the third switching element is set nonconductive in the second operation mode in order to isolate the malfunctioning second battery cell stack from the board net(s) of the electric vehicle.

In the third operation mode of the dual power supply system of the vehicle as described above at least one first load is power supplied by the second battery cell stack via the DC/DC converter, i.e. an operation voltage is supplied to at least one first load by the second battery cell stack via the DC/DC converter. Alternatively or additionally at least one second load is power supplied by the second battery cell stack, i.e. an operation voltage is supplied to at least one second load by the second battery cell stack. The third operation mode might be initiated in response to a failure, e.g., a cell failure, in the second battery cell stack. Hence, for supplying a first load, a (output) voltage is boosted (step-up conversion) from the (input) voltage of the second battery cell stack. A second load can be power supplied directly from the second battery cell stack. Particularly preferred, the first switching element is set nonconductive in the third operation mode in order to isolate the malfunctioning first battery cell stack from the board net(s) of the electric vehicle.

An exemplary embodiment of the preset invention may provide an alternative dual power supply system, particularly for an electric vehicle, for supplying different operating voltages, particularly for supplying two different board nets of an electric vehicle.

BRIEF DESCRIPTION OF THE DRAWINGS

Features will become apparent to those of ordinary skill in the art by describing in detail exemplary embodiments with reference to the attached drawings.

DETAILED DESCRIPTION OF CERTAIN INVENTIVE EMBODIMENTS

Figure 1:
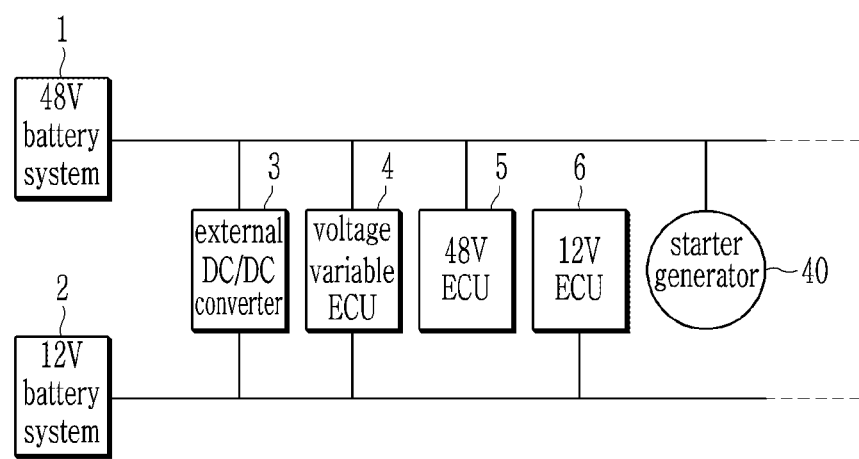
FIG. 1 schematically illustrates a prior art dual power supply system of an electric vehicle.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art.

Accordingly, processes, elements, and techniques that are not considered necessary to those having ordinary skill in the art for a complete understanding of the aspects and features of the present invention may not be described. In the drawings, the relative sizes of elements, layers, and regions may be exaggerated for clarity.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

FIG. 1 schematically illustrates the dual power supply system of an electric vehicle according to the prior art.

The dual power supply system according to the prior art comprises a 48V battery system 1 and an additional 12V battery system 2 that is external to the 48V battery system 1. The 48V battery system 1 is charged by a starter generator 40 and the 12V battery system 2 is charged by the 48V battery system 1 via an additional DC/DC converter 3 that is external to the battery systems 1, 2. The 48V battery system 1 is connected via a 48V board net to 48V supplied loads, e.g., to 48V supplied ECU 5, and the 12V battery system 2 is connected to 12V supplied loads, e.g., to 12V supplied ECU 6. A voltage variable load, e.g., a voltage variable ECU 4 with internal DC/DC converter, may be connected to the 48V battery system 1 and the 12V battery system 2. The dual power supply system according to the prior art comprises separate 48V battery system, 12V battery system and DC/DC converter and hence requires a lot of installation space, is heavy and high in production costs.

Figure 2:
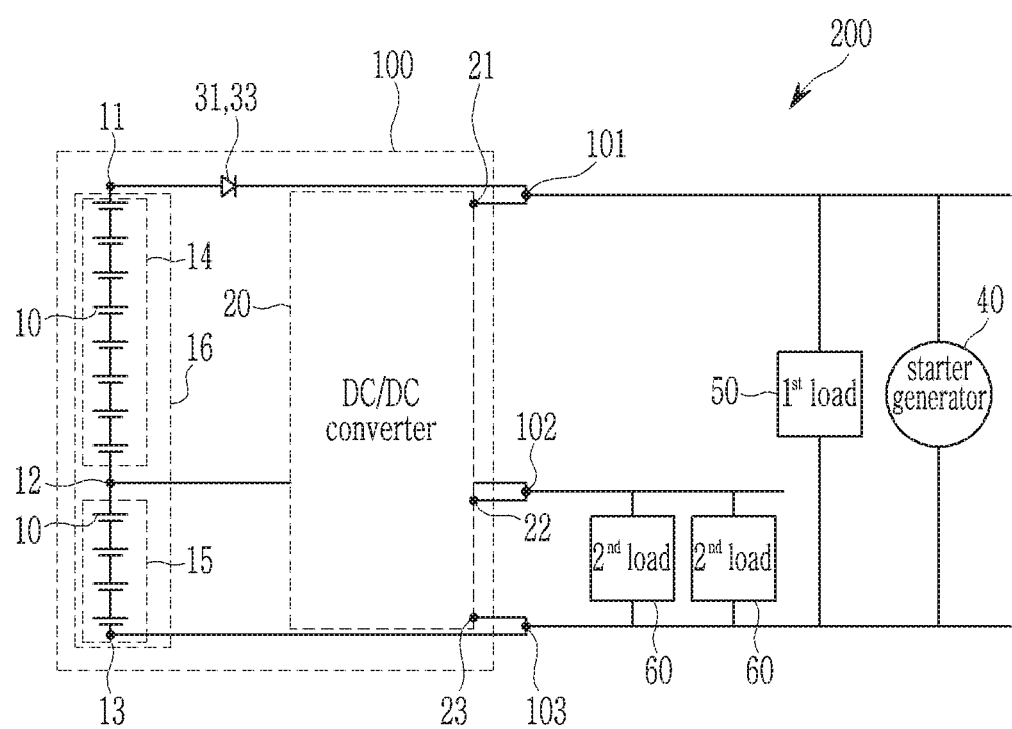
FIG. 2 schematically illustrates a circuit diagram of a vehicle according to the invention with a dual power supply system according to a first embodiment of the invention.

FIG. 2 schematically illustrates a circuit diagram of a vehicle 200 with dual power supply system 100 according to a first embodiment of the present invention.

Therein, the dual power supply system 100 comprises a battery cell stack 16 that is interconnected between a first stack node 11 and a third stack node 13. The battery cell stack 16 divides into a first battery cell stack 14 that is interconnected between the first stack node 11 and a second stack node 12 and a second battery cell stack 15 that is interconnected between the second stack node 12 and a third stack node 13.

Each of the first and second battery cell stack 14, 15 comprises a plurality of battery cells 10 connected in series. In detail, the first battery cell stack 14 comprises 8 battery cells 10, each with a capacity of about 4.5 V, and the second battery cell stack 15 comprises 4 battery cells 10, each with a capacity of about 3 V. The first battery cell stack 14 and the second battery cell 15 stack are connected in series between the first and second stack nodes 11, 12.

The dual power supply system further comprises a DC/DC converter 20 with a first converter node 21, a second converter node 22 and a third converter node 23. The DC/DC converter 20 is configured for converting a voltage (input voltage) between one of the first converter node 21 and the third converter node 23 and the second converter node 22 into a converted voltage (output voltage) between the second converter node 22 and the other one of the first converter node 21 and the third converter node 23. The converted output voltage can be set to be either higher or lower than the input voltage. Preferably, the DC/DC converter is a buck-boost-converter.

The dual power supply system 100 comprises a first system terminal 101, a second system terminal 102 and a third system terminal 103 that are each configured as external contacts of the dual power supply system 100. External loads 50, 60 can be connected to respective two of the system terminals 101, 102, 103 for being supplied with power by the dual power supply system 100. Each of the system terminals 101, 102, 103 is connected to a respective stack node 11, 12, 13 and a respective converter node 21, 22, 23 in parallel. Exemplarily, the first system terminal 101 is electrically connected to the first stack node 11 via a first conductor and to the first converter node 12 via a second conductor that is different from the first conductor. A first diode 33 is disposed as first blocking element 31 within the first conductor.

The vehicle 200 further comprises a combined starter generator 40 that is electrically interconnected between the first system terminal 101 and the third system terminal 103. A first load 50 that is configured to be supplied with about 48V is also electrically interconnected between the first system terminal 101 and the third system terminal 103. Two second loads 60 that are each configured to be supplied with about 12V are electrically interconnected between the second system terminal 102 and the third system terminal 103.

During a normal or first operation mode, the second battery cell stack 15 is charged by the starter generator 40. The second battery cell stack 15 may be drained strongly by the two second loads 60 and is hence additionally charged by the first battery cell stack 14 via the DC/DC generator 20. Therein, the voltage applied by the first battery cell stack 14 between the first and second stack nodes 11, 12 is also applied between the first and second converter nodes 21, 22 via the first and second system terminals 101, 102. Electric current flows from the first stack node 11 towards the first converter node 21 via first diode 22 and first system terminal 101. The DC/DC converter 20 steps down the voltage applied between first and second converter nodes 21, 22 to a lower output voltage applied between second and third converter nodes 22, 23. An electric current flows from the third converter node 23 to the third stack node 13 via the third system terminal 103.

In case of a cell failure in the first battery cell stack 14, the first and second battery cell stacks 14, 15 connected in series may fail to supply the first load 50. Exemplarily, the whole first battery cell stack 14 may shut down and zero voltage may apply between the first and second stack nodes 11, 12. In order to ensure continued function of the first load 50 a redundant power supply may be provided by the dual power supply system 100 in the third operation mode of the dual power supply system 100 according to the invention.

Particularly, the voltage applied by the second battery cell stack 15 between the second and third stack nodes 12, 13 is also applied between the second and third converter nodes 22, 23 via the second and third system terminals 102, 103. Electric current flows from the third stack node 13 towards the third converter node 23 via the third system terminal 103. The DC/DC converter 20 boosts (steps up) the voltage applied between second and third converter nodes 22, 23 to a higher output voltage applied between first and second converter nodes 21, 22. Electric current cannot flow from the first converter node 21 to the first stack node 11 due to first diode 33 and thus the boosted voltage is exclusively supplied to the first load 50. The DC/DC converter 20 hence provides redundant power supply of first load 50 as well as active balancing between the battery cell stacks 14, 15.

Figure 3:
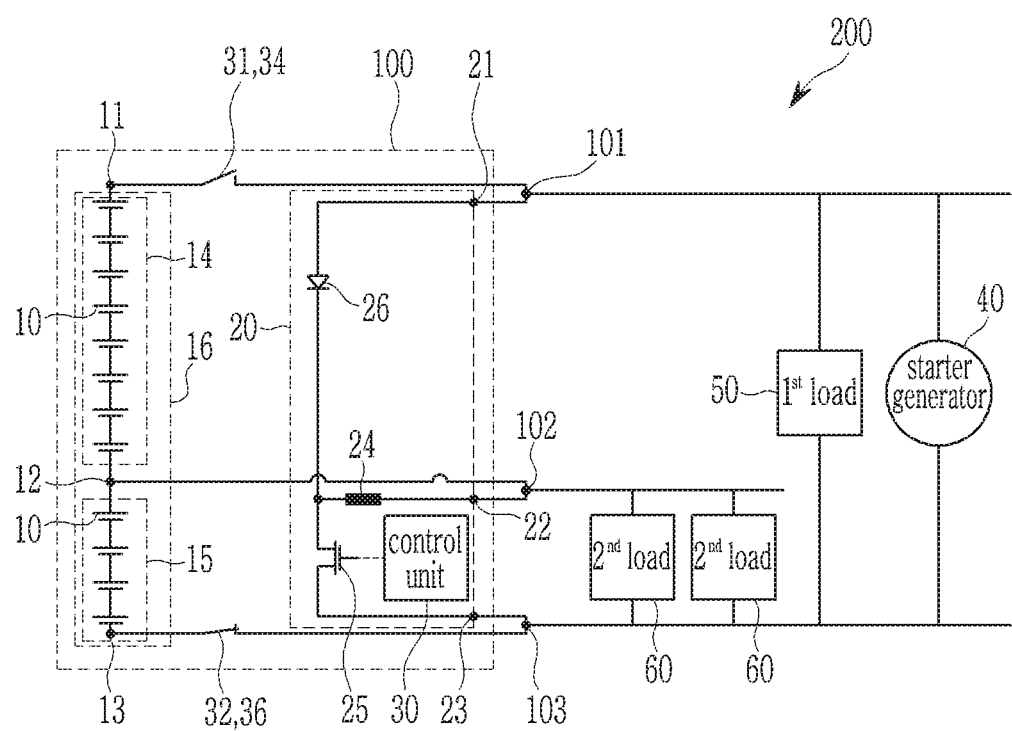
FIG. 3 schematically illustrates a circuit diagram of a vehicle according to the invention with a dual power supply system according to a second embodiment of the invention.

FIG. 3 schematically illustrates a circuit diagram of a vehicle 200 with dual power supply system 100 according to a second embodiment of the present invention. A description is omitted where the dual power supply system 100 of FIG. 3 equals the one of FIG. 2.

The dual power supply system 100 of FIG. 3 differs from the one of FIG. 2 in that the first blocking element 31 is a first switching element 34. The dual power supply system 100 further comprises a third switching element 36 as a second blocking element 32 interconnected between the third system terminal 103 and the third stack node 13.

The DC/DC generator 20 illustrated in FIG. 3 comprises an inductance 24 that is connected with its first node to a second converter node 22. A first switching transistor 25 is interconnected between a second node of the inductance 24 and the third converter node 23. The gate of the switching transistor 25 is connected to a control unit 30 that is configured for setting the switching transistor 25 either conductive or nonconductive. A diode 26 is connected with its cathode to the second node of the inductance 24 and with its anode to the first converter node 21.

During a normal or first operation mode, the first battery cell stack 14 and the second battery cell stack 15 are charged by the starter generator 40. The second battery cell stack 15 may be drained strongly by the two second loads 60 and is hence additionally charged by the first battery cell stack 14 via the DC/DC generator 20. Therein, the voltage applied by the first battery cell stack 14 between the first and second stack nodes 11, 12 is also applied between the first and second converter nodes 21, 22 via the first and second system terminals 101, 102.

Electric current flows from the first stack node 11 towards the first converter node 21 via first switching element 34 and first system terminal 101. In the DC/DC converter 20, a current flows via diode 26 to inductance 24 and magnetic energy is stored in the inductance 24. The first switching element 34 is set nonconductive and simultaneously or subsequently the switching transistor 25 is set conductive. Hence, the magnetic energy in the inductance 24 causes a current to flow into the third stack node 13 via third converter node 23, third system terminal 103 and third switching element 36 that is set conductive. The amplitude ratio of the input voltage of the and the output voltage of the DC/DC converter 20 is determined by the duty cycles of first switching element 34 and switching transistor 25.

A cell failure in the second battery cell stack 15 may shut down the whole second battery cell stack 15 such that zero voltage applies between the second and third stack nodes 12, 13. Hence, the second loads 60 are no longer supplied. In order to ensure continued function of the second loads 60 a redundant power supply may be provided by the dual power supply system 100 in the second operation mode according to the invention. Further, the second battery cell stack 15 may be disconnected from the board nets of the vehicle 200 by setting the third switching element 36 nonconductive in the second operation mode.

Particularly, the voltage applied by the first battery cell stack 14 between the first and second stack nodes 11, 12 is also applied between the first and second converter nodes 21, 22 via the first and second system terminals 101, 102. Electric current flows from the first stack node 11 towards the first converter node 21 via first switching element 34 and first system terminal 101. The DC/DC converter 20 steps down the voltage applied between first and second converter nodes 21, 22 to a lower output voltage applied between second and third converter nodes 22, 23 as described above with respect to balancing. The third switching element 36 is set nonconductive and the current cannot flow into the third stack node 13 but flows out from third system terminal 103 and redundant power supply is provided to the second loads 60. Hence, in FIG. 3 the DC/DC converter 20 is a step-down converter that provides the function of a redundant power supply as well of active balancing.

Figure 4:
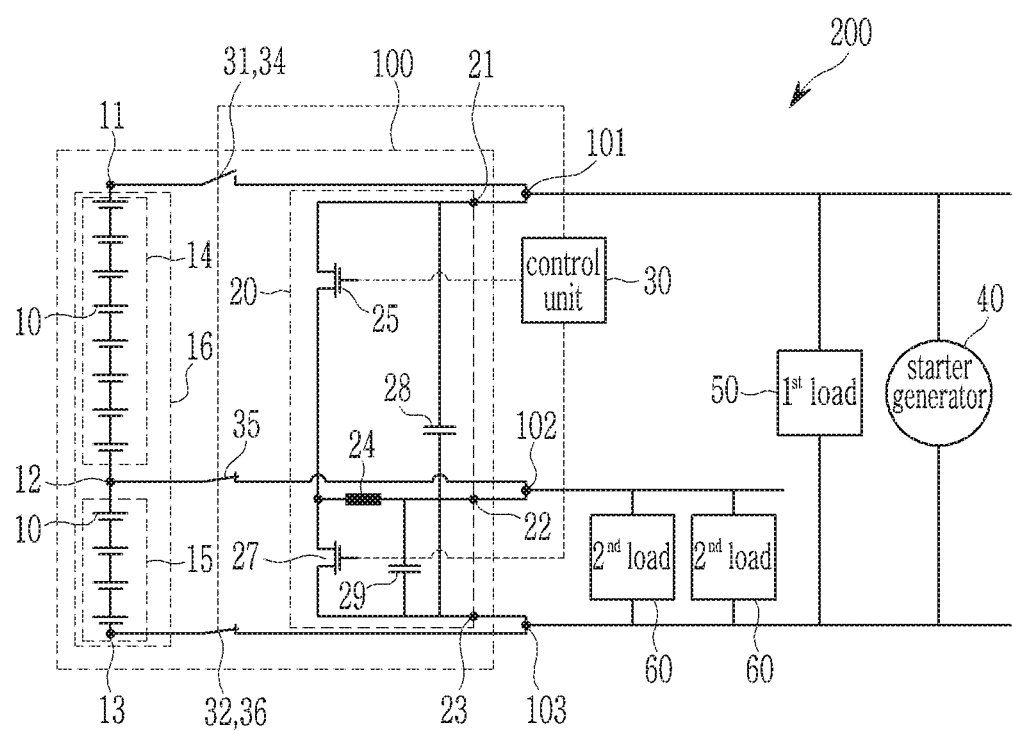
FIG. 4 schematically illustrates a circuit diagram of a vehicle according to the invention with a dual power supply system according to a third embodiment of the invention.

FIG. 4 schematically illustrates a circuit diagram of a vehicle 200 with dual power supply system 100 according to a third embodiment of the present invention. A description is omitted where the dual power supply system 100 of FIG. 3 equals the one of FIG. 2 or 3.

The dual power supply system 100 of FIG. 4 differs from the ones of FIGS. 2 and 3 in that it comprises a first switching element 34 as first blocking element 31, a third switching element 36 as a second blocking element 32 and further comprises a second switching element 35 interconnected between the second stack node 12 and the second system terminal 102. Each of the switching elements 34, 35, 36 is a relay that is wirelessly controlled by control unit 30 as indicated by the dashed dotted line.

The DC/DC converter 20 of FIG. 4 differs from that of FIG. 3 in that it comprises a first switching transistor 25 interconnected between the second node of inductance 24 and the first converter node 21 and a second switching transistor 27 interconnected between the second node of inductance 24 and the third converter node 23. The gate of each of the switching transistors 25, 27 is connected to control unit 30 that sets the transistors 25, 27 either conductive or nonconductive in an alternating manner.

The DC/DC converter 20 of FIG. 4 further comprises a first capacitor 28 interconnected between the first converter node 21 and the third converter node 23 and connected in parallel to the first switching transistor 25. The DC/DC converter 20 further comprises a second capacitor 29 interconnected between the second converter node 22 and the third converter node 23 and connected in parallel to the second switching transistor 27.

During a normal or first operation mode, the second battery cell stack 15 may be drained strongly by the two second loads 60 and is hence additionally charged by the first battery cell stack 14 via the DC/DC generator 20. Therein, the first switching element 34 and the third switching element 36 are set conductive, the first switching transistor 25 is set conductive, the second switching transistor 27 is set nonconductive and hence the inductance 24 is charged via first converter node 21 by first battery cell stack 14. Therein, the first capacitor 28 protects first switching transistor 25 against AC components and further limits the total current over first switching transistor 25. Subsequently, the first switching transistor 25 is set nonconductive, the second switching transistor 27 is set nonconductive and the inductance 24 is discharged via third converter node 23 and third switching element 36 into the second battery cell stack 15. The second capacitor 29 protects second switching transistor 27 against AC components and further limits the total current over second switching transistor 27. The DC/DC converter 20 acts as step down converter, wherein the ratio of input and output voltages of DC/DC converter 20 is set by the duty cycles of transistors 25, 27.

During a normal or first operation mode, the first battery cell stack 14 may be drained strongly by the first loads 50 and is hence additionally charged by the second battery cell stack 15 via the DC/DC generator 20. Therein, the first switching element 34 and the third switching element 36 are set conductive, the second switching transistor 27 is set conductive, the first switching transistor 25 is set nonconductive and hence the inductance 24 is charged via third converter node 23 by the second battery cell stack 15. The second capacitor 29 protects second switching transistor 27 against AC components and further limits the total current over second switching transistor 27. Subsequently, the second switching transistor 27 is set nonconductive, the first switching transistor 25 is set nonconductive and hence the inductance 24 is discharged via first converter node 21 and first switching element 34 into the first battery cell stack 14. 27 The DC/DC converter 20 acts as step up converter in this case, wherein the ratio of input and output voltages of DC/DC converter 20 is set by the duty cycles of transistors 25, 27.

A cell failure in the second battery cell stack 15 may shut down whole second battery cell stack 15 such that zero voltage applies between the second and third stack nodes 12, 13. Hence, the second loads 60 are no longer supplied. In order to provide continued function of the second loads 60 a redundant power supply may be provided by the dual power supply system 100 in the second operation mode according to the invention. Further, the second battery cell stack 15 may be disconnected from the board nets of the vehicle 200 by setting the third switching element 36 nonconductive in the second operation mode. The first switching element 34 is set conductive in the in the first operation mode.

Particularly, the voltage applied by the first battery cell stack 14 between the first and second stack nodes 11, 12 is also applied between the first and second converter nodes 21, 22 via the first and second system terminals 101, 102. Electric current flows from the first stack node 11 towards the first converter node 21 via first switching element 34 and first system terminal 101. The DC/DC converter 20 steps down the voltage applied between first and second converter nodes 21, 22 to a lower output voltage applied between second and third converter nodes 22, 23 as described above with respect to balancing. The third switching element 36 is set nonconductive and a current cannot flow into the third stack node 13 but flows out from third system terminal 103. Hence redundant power supply is provided to the second loads 60 by the DC/DC converter 20 acting as a step down converter.

A cell failure in the first battery cell stack 14 may shut down the whole first battery cell stack 14 and zero voltage may apply between the first and second stack nodes 11, 12. In order to provide continued function of the first load 50 a redundant power supply may be provided by the dual power supply system 100 in the third operation mode according to the invention. Further, the first battery cell stack 14 may be disconnected from the board nets of the vehicle 200 by setting the first switching element 34 nonconductive in the third operation mode. The third switching element 36 is set conductive in the in the third operation mode.

Particularly, the voltage applied by the second battery cell stack 15 between the second and third stack nodes 12, 13 is also applied between the second and third converter nodes 22, 23 via the second and third system terminals 102, 103. Electric current flows from the third stack node 13 towards the third converter node 23 via third switching element 36 and third system terminal 103. The DC/DC converter 20 boosts (steps up) the voltage applied between second and third converter nodes 22, 23 to a higher output voltage applied between first and second converter nodes 21, 22 as described above with respect to balancing. The first switching element 34 is set nonconductive and a current cannot flow into the first stack node 11 but flows out from first system terminal 101. Hence redundant power supply is provided to the first load 50 by the DC/DC converter 20 as a step up converter.

According to FIG. 4 the DC/DC converter 20 is a buck boost converter that provides redundant power supply with respect to the first load 50 and the second loads 60 and that further provides bidirectional active balancing between the first and second battery cell stacks 14, 15.

The electronic or electric devices and/or any other relevant devices or components according to embodiments of the present invention described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g., on a PCB or another kind of circuit carrier. The conducting elements may comprise metallization, e.g., surface metallizations and/or pins, and/or may comprise conductive polymers or ceramics. Further electrical energy might be transmitted via wireless connections, e.g., using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

What is claimed is:

1. A dual power supply system with a first system terminal, a second system terminal, and a third system terminal, the system comprising:
   a first battery cell stack interconnected between a first stack node and a second stack node and configured to provide a first operation voltage;
   a second battery cell stack interconnected between the second stack node and a third stack node and configured to provide a second operation voltage; and
   a DC/DC converter comprising a first converter node, a second converter node and a third converter node and configured to:
      convert the first operation voltage applied between the first converter node and the second converter node to a first output voltage applied between the second converter node and the third converter node in a first mode, and
      convert the second operation voltage applied between the second converter node and the third converter node to a second output voltage applied between the first converter node and the second converter node in a second mode,
   wherein the first system terminal is connected to the first stack node and the first converter node in parallel, the second system terminal is connected to the second stack node and the second converter node in parallel, and the third system terminal is connected to the third stack node and the third converter node in parallel,
   wherein the DC/DC converter further comprises a control unit configured to: i) determine a failure of the first battery cell stack and a failure of the second battery cell stack, ii) initiate the first mode in response to the failure of the second battery cell stack, and iii) initiate the second mode in response to the failure of the first battery cell stack.

2. The dual power supply system according to claim 1, further comprising:
   a first blocking element configured to block a current from the first system terminal to the first stack node; and/or
   a second blocking element configured to block a current from the third system terminal to the third stack node.

3. The dual power supply system according to claim 2, wherein the first blocking element is a first diode with an anode connected to the first stack node and a cathode connected to the first system terminal.

4. The dual power supply system according to claim 2, wherein the first blocking element is a first switching element configured to selectively block a current from the first system terminal to the first stack node, and/or wherein the second blocking element is a third switching element configured to selectively block a current from the third system terminal to the third stack node.

5. The dual power supply system according to claim 4, further comprising a second switching element interconnected between the second system terminal and the second stack node.

6. The dual power supply system according to claim 5, wherein at least one of the first switching element, the second switching element, or the third switching element is a relay.

7. The dual power supply system according to claim 1, wherein the sum of the first operation voltage and the second operation voltage is about 48 V, and wherein the second operation voltage is about 12 V.

8. The dual power supply system according to claim 1, wherein the DC/DC converter comprises an inductance electrically connected to the second converter node, a switching transistor interconnected between the inductance and one of the first converter node and the third converter node, and a diode with its cathode connected to the inductance and its anode connected to the other one of the first converter node and the third converter node.

9. The dual power supply system according to claim 8, wherein the control unit is further configured to set the duty cycle of the switching transistors.

10. The dual power supply system according to claim 1, wherein the DC/DC converter comprises an inductance electrically connected to the second converter node, a first switching transistor interconnected between the inductance and the first converter node, and a second switching transistor interconnected between the inductance and the third converter node.

11. A vehicle comprising the dual power supply system according to claim 1, further comprising a starter generator interconnected between the first system terminal and the third system terminal.

12. The dual power supply system according to claim 1, wherein the first system terminal comprises a first external contact connected to the first stack node via a first conductor and connected to the first converter node via a second conductor different from the first conductor, the second system terminal comprises a second external contact connected to the second stack node via a third conductor and connected to the second converter node via a fourth conductor different from the third conductor, and the third system terminal comprises a third external contact connected to the third stack node via a fifth conductor and connected to the third converter node via a sixth conductor different from the fifth conductor, and wherein the first, second, and third external contacts are configured to be connected to a load external to the dual power supply system.

13. The dual power supply system according to claim 1, wherein the control unit is configured to determine the failure of the first battery cell stack based on a zero voltage being applied between the first and second stack nodes, and determine the failure of the second battery cell stack based on a zero voltage being applied between the second and third stack nodes.

14. A vehicle comprising the dual power supply system according to claim 1, further comprising at least one first load interconnected between the first system terminal and the third system terminal and at least one second load interconnected between the second system terminal and the third system terminal, wherein the first load has an operation voltage of about 48 V and the second load has an operation voltage of about 12 V.

15. A method for operating the dual power supply system of the vehicle according to claim 14, the method comprising:
(a) in a first operation mode supplying an operation voltage to at least one first load by the first battery cell stack and the second battery cell stack or by the starter generator and/or supplying an operation voltage to at least second load by the second battery cell stack;
(b) in a second operation mode supplying an operation voltage to at least one first load by the first battery cell stack via the DC/DC converter and/or supplying an operation voltage to at least one second load by the first battery cell stack via the DC/DC converter; and
(c) in a third operation mode supplying an operation voltage to at least one first load by the second battery cell stack via the DC/DC converter and/or supplying an operation voltage to at least one second load by the second battery cell stack.

16. The method according to claim 15, wherein the dual power supply system includes a first blocking element configured to block a current from the first system terminal to the first stack node; and/or a second blocking element configured to block a current from the third system terminal to the third stack node, wherein the first blocking element is a first switching element configured to selectively block a current from the first system terminal to the first stack node, and/or wherein the second blocking element is a third switching element configured to selectively block a current from the third system terminal to the third stack node, and
wherein the first operation mode further comprises:
(a1) setting the third switching element conductive and transferring electric power from the first battery cell stack to the second battery cell stack via the DC/DC converter; or
(a2) setting the first switching element conductive and transferring electric power from the second battery cell stack to the first battery cell stack via the DC/DC converter.

17. The method according to claim 16, further comprising:
(b1) setting the third switching element nonconductive in the second operation mode; and
(c1) setting the first switching element nonconductive in the third operation mode.

18. A dual power supply system with a first system terminal, a second system terminal, and a third system terminal, the system comprising:
a first battery cell stack interconnected between a first stack node and a second stack node and configured to provide a first operation voltage;
a second battery cell stack interconnected between the second stack node and a third stack node and configured to provide a second operation voltage; and
a DC/DC converter comprising a first converter node, a second converter node and a third converter node and configured to:
convert the first operation voltage applied between the first converter node and the second converter node to a first output voltage applied between the second converter node and the third converter node in a first mode, and
convert the second operation voltage applied between the second converter node and the third converter node to a second output voltage applied between the first converter node and the second converter node in a second mode, wherein the first system terminal is connected to the first stack node and the first converter node in parallel, the second system terminal is connected to the second stack node and the second converter node in parallel, and the third system terminal is connected to the third stack node and the third converter node in parallel, wherein the DC/DC converter further comprises a control unit configured to: i) determine a failure of the first battery cell stack and a failure of the second battery cell stack, ii) initiate stepping down the first operation voltage applied between the first and second converter nodes to a lower output voltage applied between the second and third converter nodes in response to the failure of the second battery cell stack, and iii) initiate stepping up the second operation voltage applied between the second and third converter nodes to a higher output voltage applied between the first and second converter nodes in response to the failure of the first battery cell stack.

\* \* \* \* \*